United States Patent Office 3,391,007
Patented July 2, 1968

3,391,007
METHOD OF EMULSIFYING AND CURING
MEAT PRODUCTS
Louis Sair, Evergreen Park, and Stephan L. Komarik, Chicago, Ill., assignors to The Griffith Laboratories, Inc., Chicago, Ill., a corporation of Illinois
No Drawing. Filed Sept. 4, 1964, Ser. No. 394,605
8 Claims. (Cl. 99—159)

ABSTRACT OF THE DISCLOSURE

Non-shorting acidic meat emulsions to be cured with heat are produced by emulsifying a meat composition containing a radical of an edible acid of phosphorus preferably supplied in part at least by an acid-reacting salt of such acid, the meat composition having a pH lower than the meat component, which lowered pH would short the meat in the absence of said phosphate radical.

---

The present invention relates generally to the curing of emulsified meat products, and in particular, to accelerating the process to adapt it to automation procedure.

Curing of meat has long been effected by generation of nitric oxide from supplied alkali-metal nitrite and/or nitrate, it being recognized that nitrite produces a faster cure than nitrate alone. The cure is a reaction of the nitric oxide with the pigments of the meat. The color of cured meat must develop in a reducing and acid environment, and once developed, the color can be fixed by heat.

Meat on standing, as in a chill room, develops its own reducing environment and heretofore storage for an appreciable time in a chill room has been practiced to effect this environment and initiate the curing reaction. Also, it has been commercial practice to place the meat with its curing agent in a moderately heated chamber, whereby the slow heating of the meat permits the color to develop and be fixed. Both of these procedures call for extended times for processing.

Acidity favors the curing reaction and color development, but little study has been given to acidity. On death and during rigor mortis lactic acid is generated in the meat, the quantity formed being dependent on many factors, as a result of which raw meat to be processed varies greatly in its acidity. It is known that additional acid will accelerate the cure, but there are other factors working against the addition of acid. Meat to be encased is first comminuted and emulsified and this is commonly done with the curing salt already present with the meat. Emulsification is the comminuting and surrounding of the fat particles with protein. Heretofore, it has been accepted as a rule that a too-acid condition prevents forming a good emulsion, or if such condition is effected after emulsification it breaks the emulsion, or "shorts" it. Therefore, comminuting and emulsifying have long been done without adding acid, except that small and controlled amounts of an isomer of ascorbic acid have been added, not for its acidity but rather for its reducing power. In fact, the addition of alkaline material has been practiced to aid in emulsification. The present invention makes an exception to the rule against adding the acid intended for the cure before the meat is emulsified.

U.S. Patents Nos. 2,992,115, 2,992,116 and 3,112,442 describe certain lactones and use thereof gradually to generate acidity in meats. The lactones are those which slowly hydrolyze and form edible acid. In emulsifying meat the protein functions as a colloid to surround the fat particles. By the presence of such a lactone during the emulsification the function of the protein is not impaired. Once the emulsion is formed the lactone can slowly generate acid without destroying the emulsion, so that the generated acid may exert its function in the curing reaction. The preferred lactone is glucono delta lactone (GDL).

Hollenbeck in U.S. No. 2,739,899 has taught the use of an ene-diol compound, thus to provide the reducing environment. The introduction of such a compound into the meat industry has reduced the processing time as well as improved the cured color. Ascorbic acid and d-icoascorbic acid and their water-soluble salts are the preferred ene-diol compounds, the salts being preferred to avoid increasing the acidity of the meat.

Because meat is perishable, the shorter the time that the meat is in process, the better is the quality of the product. The use of ascorbates to a degree shortens one step in the processing period. The use of a source of acid, as by using GDL in combination with the ene-diol compound, preferably the ascorbates, can shorten the last step in the process, when such step is carried out according to the present invention.

Modern packers have long aimed to expedite the curing of sausage products by eliminating batch processing, long time storage in chill rooms, delays to stuff casings, and long time hanging in a smokehouse. New and expensive apparatus have been devised in efforts leading to automation. Among these are continuous stuffing machines, and especially continuous comminuting machines in which the meat mixed with curing salts with or without ascorbate salts can be emulsified. These are frequently operated in tandem, effecting the final emulsion in a second unit. Such continuous emulsifiers replace the silent cutter which operates only in batches.

Another known acceleration step is to subject a completed emulsion to a vacuum to withdraw air, thus more quickly to effect the reducing environment for the cure reaction. Such a step is desirable, but optional.

To secure the fixed cured color the meat must be heated. It has been the practice gradually to heat the meat in an environment of gradually increasing temperatures for a sufficient time to effect the desired color and to bring the internal temperature to about 155° F. The use of ascorbates shortens this period by permitting the temperature of the heating environment to be raised more rapidly.

In our copending application Ser. No. 439,976, filed Mar. 15, 1965 as a continuation-in-part of Ser. No. 388,288, filed Aug. 7, 1964, now abandoned, there is described a rapid process of curing meat products containing an ene-diol compound and a non-shorting quantity of added acidifying material including essentially a slowly hydrolyzing lactone, by promptly encasing such an emulsion and promptly curing the same in a smokehouse in an environment of 200° F. to 300° F., until the internal temperature is raised to 150° F.–160° F.

Said application and said patents state that a too-acid condition prevents the formation of a good emulsion, and therefore, the acid for the cure was largely provided by use of a lactone. The present invention is based upon knowledge that when an effective quantity of an edible acid-reacting phosphate is present in quantity to lower the pH of the meat component, an emulsion can be made and maintained at a pH which would short the emulsion if otherwise produced, for example, by acidifying material, such as potassium acid tartrate, lactic, gluconic, citric, ascorbic and isoascorbic acids, and in the absence of the phosphate radical.

The terms "phosphate" and "phosphate radical" are used herein in a generic sense and contemplate edible salts of acids of phosphorus, such as phosphoric acid and molecularly dehydrated phosphoric acids.

Heretofore, alkaline phosphate salts or combinations of various phosphate salts have been used to elevate the pH of the meat toward 7 in order to improve the waterholding power of the meat and to minimize purging. Such combinations are shown in Bickel U.S. No. 3,029,150, and in Lauch et al. No. 3,118,777, wherein strictly alkaline phosphate salts are tempered by combination with acid-reacting phosphates. Among the alkaline salts are disodium orthophosphate, sodium tripolyphosphate and tetra-sodium pyrophosphate. It is also known that alkalies such as sodium carbonate and caustic soda likewise function to minimize purging, thus leading to a belief that the virtue of said alkaline phosphate salts or combinations thereof in elevating the pH of the meat toward 7, is due solely to the alkaline content.

According to our discovery, the phosphate radicals have functions apart from and in addition to the alkaline content above referred. In emulsification we have found that the phosphate radicals counteract the shorting tendency of acidity at a pH lower than that of the meat component. We believe that such radicals effect such a softening of the protein of the meat that excellent emulsions may be formed and made stable at a pH of the composition which is lower than the original pH of the meat and at which the lowered pH might prevent good emulsification in the absence of a phosphate radical. As a result, emulsification can take place in the presence of sufficient acid to expedite the cure.

We have thus found that the lowered pH of the resulting emulsion can prevail in the final heating process to minimize purging at a pH which in the absence of such phosphate radical would induce shorting and purging.

It is the object of the invention to form a meat emulsion containing curing salt in the presence of acidic material in quantity to lower the pH of the meat, and in the presence of a phosphate radical, in quantity to counteract the tendency of the acidified composition to produce a shorting emulsion during the processing of the emulsion to cured condition.

It is a particular object of the invention to provide at least a part of the acid material and at least a part of said phosphate radical by including in the composition at least one edible acid-reacting salt of an acid selected from the group consisting of phosphoric acid and molecularly dehydrated phosphoric acids.

There are many acid-reacting phosphates, including monocalcium acid phosphate, and alkali-metal salts of orthophosphoric acid and of pyrophosphoric acid. More complex ones are available and are known as additives for use in meat in combination with alkaline salts such as sodium tripolyphosphate and tetrasodium pyrophosphate, which combinations do not lower the pH of the meat, but preferably elevate it. Such complex salts and such combinations in processed meat are described in Lauck et al. No. 3,118,777 of which the preferred one is one of the forms referred to as sodium aluminum phosphate (SAP), containing as cations sodium, aluminum and hydrogen in varying proportions and acid value.

Because the phosphate radicals have a function and because the acidity of a phosphate salt has a function, the various effective acid-reacting phosphate salts are not equivalent weight for weight in the present invention, as will be shown hereinafter. Because the pH of the meat component varies, an effective usage amount for a high-pH meat can be an excessive and shorting amount for a low-pH meat. Therefore, it is to be understood that the limiting maximum usage of effective amounts of acid phosphate salt depends both on the pH of the meat and the particular phosphate salt which is or which is included in the acidifying material.

We have found that at least one form of SAP to a limited extent can be substituted for GDL in comparative emulsifications. The available acidity of the SAP test during emulsification unexpectedly can give an excellent emulsion, contrary to the knowledge that a like acidity from other acidifying agents, such as potassium acid tartrate, and gluconic acid (derivable from GDL), would short the emulsion. From this we have learned that the phosphate radicals permit forming and maintaining emulsions at pH values lower than when otherwise achieved, and lower than the original pH of the meat.

Since greater acidity favors quicker and better color development after the emulsion is made, it is thus possible and more economic to produce the emulsion with such acid-reacting phosphates present with or without a lactone, than heretofore in using only a lactone such as GDL.

Since those who process meat use set formulas for their meat supplies, and since the meat supplies vary in acidity, it is possible to produce during emulsification a shorting quantity of acid when the added acidifying material includes an acid-reacting phosphate. While GDL will not induce shorting of the emulsion during emulsification, the presence of a given quantity of a given acid phosphate salt during emulsification may or may not short the emulsion depending upon the character of the meat. Accordingly, as one safe-guard against such possibility in commercial operations using a set formula, part of the acidity available from such a given quantity is replaced by use of a lactone, so as to become available during the cure. Hence, for assurance that all supplies of edible meat, whether high or low in meat acid, can be safely emulsified by use of a standard formula, it is preferred to add to the meat mass a combination of acidifying material for the emulsification and for the ultimate cure, which combination includes a lactone. The lactone, being inert during emulsification, generates acid for the cure after the emulsion is made. In other words, the total acid from the combination is for the cure, and the lactone lessens the available acidity during the emulsification.

Sodium aluminum phosphate (SAP) is used in the baking industry in combination with sodium bicarbonate as a levening acid. U.S. Patent No. 2,550,490 describes such use stating that it generates carbon dioxide slowly, that it is slowly soluble in water and slowly hydrolyzes. Although SAP provides substantial acidity, we have found that SAP is not comparable to GDL when used in a meat emulsion, and that its acidity is available almost immediately, as shown below:

An emulsion of Composition No. 1 was divided into three parts, one as a control, and the others, respectively, for adding 4 ounces of GDL and 4 ounces of SAP per 100 pounds of meat.

Composition No. 1
```
Meat _____ lbs.___ 100
Water _____ do____  25
Sodium chloride _____ do____   2
Curing salt PP _____ ozs___   4
    Sodium chloride, 90%
    Sodium nitrite, 4%
    Sodium nitrate, 4%
Sodium erythorbate _____ oz___   ¾
```

After adding the GDL and the SAP the pH values of the emulsions were taken as shown in Table I.

TABLE I

| Time Sampled | Temperature of Emulsion, °C. | pH | | |
|---|---|---|---|---|
| | | Control | GDL | SAP |
| 5 minutes | 20 | 5.85 | 5.85 | 5.7 |
| 15 minutes | 20 | 5.80 | 5.85 | 5.7 |
| 30 minutes | 20 | 5.80 | 5.70 | 5.7 |
| 1 hour | 24 | 5.80 | 5.70 | 5.7 |
| 2 hours | 25 | 5.80 | 5.65 | 5.7 |
| 3 hours | 26 | 5.80 | 5.62 | 5.7 |

The emulsions did not short.

EXAMPLE 1

Tests were made to compare citric acid, alkali-metal phosphates, GDL and SAP as used during emulsification, followed by prompt encasing and prompt heating in a smokehouse at 250° F.

Meat Composition No. 2 was used:

| | | |
|---|---|---|
| Lean beef | lbs | 50 |
| Skinned pork jowls | do | 50 |
| Chipped ice | do | 35 |
| Sodium chloride | do | 2.5 |
| Sodium erythorbate | oz | 1.0 |
| Curing salt PP | ozs | 4 |
| Frankfurter seasoning | do | 8 |

Varying quantities of acidifying material were added to the composition in quantities per 100 pounds of meat, as given in Table II below. The pH values of the emulson as immediately formed, an hour later, and in the finished product, were determined as given in Table II. The visual character and the measured color value of the product were determined, the latter being made upon an acetone extract of the color, and the reading of it in an electrophotometer using a 525B filter. The higher the value, the better the color.

TABLE II

| Item No. | Additive per 100 lbs. of Meat | | Emulsion pH at | | Finished Product | | |
|---|---|---|---|---|---|---|---|
| | Kind | Amount in Ounces | 0 Min. | 60 Min. | pH | Color Value | Visual Observation |
| 1 | Control | | 5.80 | 5.70 | 5.90 | 27 | Gray. |
| 2 | GDL | 7 | 5.75 | 5.49 | 5.45 | 52 | Excellent color. |
| 3 | SAP | 7 | 5.50 | 5.45 | 5.45 | 52 | Do. |
| 4 | Na₂H₂P₂O₇ | ¹ 7 | 5.52 | 5.45 | 5.57 | 50 | Do. |
| 5a | NaH₂PO₄ | 7 | 5.65 | 5.60 | 5.70 | 42 | Boderline color, Emulsion good. |
| 5b | YaH₂PO₄ | ¹ 12 | 5.59 | 5.45 | 5.65 | 51 | Satisfactory color, Emulsion Broke.² |
| 6 | Citric Acid | ¹ 1 | 5.55 | 5.40 | 5.65 | 48 | Do.² |

¹ These quantities have the same acidity in terms of titratable acid to elevate the pH to 6, using sodium hydroxide.
² Fat and water separated.

Table II shows with respect to the particular meat composition, that the meat (control) requires acid for quickly developing the cured color. Items 2 to 6 show that sufficient acid to lower the pH and for color has been used. Item 5a shows that 7 ounces is a non-shorting quantity of monosodium phosphate to produce a good emulsion with commercially borderline color. But, Item 5b shows that increasing that amount to 12 ounces provides an effective shorting quantity of acid with satisfactory color, but nevertheless, a commercially unacceptable product. Items 4, 5b and 6 introduced the same amount of acid, but the pyrophosphate radical in Item 4 was effective to prevent shorting of the emulsion. Items 2 and 3 show that the acidity in the emulsion from GDL developed slowly, while that from SAP is immediate.

In order to demonstrate that the available acidifying materials are not equivalent weight for weight, a solution of each was made by dissolving one gram in 100 ml. of water, measuring the initial pH values at room temperature, and after heating for 30 minutes at 160° F. and cooling to room temperature. The cooled solutions were titrated with a tenth-normal solution of sodium hydroxide to a pH of 6.0. Table III shows the results.

TABLE III

| Item No. | Agent | pH of 1% Solution | | Ml. of 0.1 N NaOH |
|---|---|---|---|---|
| | | Initial | After Cooling | |
| 1 | Sodium aluminum phosphate (SAP) | 3.2 | 2.5 | 41.2 |
| 2 | Sodium acid pyrophosphate (Na₂H₂P₂O₇) | 4.3 | 4.3 | 20.3 |
| 3 | Monosodium phosphate NaH₂PO₄ | 4.5 | 4.5 | 11.3 |
| 4 | Glucono delta lactone (GDL) | 3.9 | 3.12 | 45.2 |
| 5 | Sodium aluminum phosphate 50%, Sodium tripolyphosphate 50% | 5.80 | 5.50 | 5.0 |
| 6 | Sodium aluminum phosphate 50%, Tetrasodium pyrophosphate 50% | 6.4 | 6.0 | 0 |
| 7 | Citric acid | | | 140 |
| 8 | Monocalcium acid phosphate | 4.1 | | 34.8 |

Table III shows that GDL and SAP are highest in acidity, GDL being higher in available acidity than SAP. Items 5 and 6 show how SAP reduces the pH of the alkaline phosphate salts combined with it.

EXAMPLE 2

Tests were made to compare fast-cured frankfurters finished at 250° F. and made with emulsions containing per 100 pounds of meat 7 ounces each of (1) tetrasodium pyrophosphate, (2) sodium acid pyrophosphate (3) various mixtures of (1) and (2), and (4) disodium phosphate as set forth in Table IV using meat Composition No. 3.

| | | |
|---|---|---|
| Lean beef | lbs | 50 |
| Skinned jowls | do | 50 |
| Chipped ice | do | 30 |
| Sodium chloride | do | 2.5 |
| Curing salt PP (as above) | ozs | 4 |
| Frankfurter seasoning | do | 8 |
| Sodium erythorbate | oz | 1 |

The smokehouse schedule was as follows: 9 minutes at 250° F. (D.B.), 6 minutes at 250° F. (D.B.)—165° F. (W.B.).

TABLE IV

| Item No. | Mixture | | pH of Mixture in 1% Sol. | pH of Emulsion After— | | Finished Product | | |
|---|---|---|---|---|---|---|---|---|
| | Sodium Acid Pyro., Percent | Tetrasodium Pyro., Percent | | 5 Min. | 1 Hr. | pH | Color Value | Visual Observation |
| 1 | 0 | 100 | 10.1 | 6.20 | 6.10 | 6.25 | 10.0 | Gray with brownish cast. |
| 2 | 25 | 75 | 8.2 | 5.90 | 5.90 | 6.15 | 18.5 | Do. |
| 3 | 75 | 25 | 5.90 | 5.65 | 5.55 | | 44.0 | Slight pink with brownish cast. |
| 4 | 87.5 | 12.5 | 5.5 | 5.55 | 5.45 | 5.75 | 46.0 | Better than Item 3. |
| 5 | 100 | 0 | 4.3 | 5.50 | 5.48 | 5.67 | 53.0 | Excellent color. |
| 6 | (¹) | (¹) | | 6.00 | 6.00 | | 11.0 | Deep gray. |
| 7 | (²) | (²) | | 5.75 | 5.70 | | 28.5 | Gray. |

¹ Disodium Phosphate.
² Control.

Items 1, 2, 6 and 7 show that insufficient acidity leads only to a gray color. Items 3, 4 and 5 show that increased acidity in the emulsion leads to improvement in cured color, the highest acidity from sodium acid pyrophosphate of Item 5 being the best.

EXAMPLE 3

As previously indicated acidity is important for color and the phosphate radical is important for good emulsions in the presence of the acid for the cure. Thisi s demonstrated in the use of meat Composition No. 4, as disclosed in Table V.

Composition No. 4:
- Lean beef _____ lbs__ 50
- Skinned pork jowls _____ do__ 30
- Chipped ice _____ do__ 30
- Sodium chloride _____ do__ 2.5
- Curing salt PP _____ ozs__ 4
- Sodium erythorbate _____ oz__ 1
- Frankfurter seasoning _____ ozs__ 8
- Additive _____ ozs__ x The mass was emulsified with the additives of Table V, promptly encased, and then heated in the smokehouse on the following schedule: 9 minutes at 250° F. (D.B.), 6 minutes at 250° F. (D.B.)—165° F. (W.B.)

TABLE V

| Item No. | x ounces-Additive [1] | pH of Emulsion | pH | Finished Product Color Value | Finished Product Visual Observation |
|---|---|---|---|---|---|
| 1 | 7-SAP | 5.50 | 5.5 | 53 | Emulsion broke, Good color. |
| 2 | 4-SAP | 5.60 | 5.60 | 48 | Do. |
| 3 | 7-Sodium acid pyro | 5.65 | 5.65 | 44 | Good color, Good emulsion. |
| 4 | 3.5 SAP, 3.5 Tetrasodium pyro | 5.80 | 5.80 | 35 | Gray, Good emulsion. |
| 5 | 3.5 SAP, 3.5 Sodium tripolyphosphate | 5.77 / 5.75 | 5.77 | 38 | Slight pink, Good emulsion. |
| 6 | 7 Monocalcium phosphate | 5.60 | 5.65 | 49 | Good color, Good emulsion. |

[1] Per 100 pounds of meat.

In our copending application Ser. No. 388,288 GDL was found to be an ideal agent for acceleration of cured color. Acid phosphates vary in their functions pertaining to acidity and emulsification, and as shown in Table V, there must be a proper balance between the acid function and the counteracting phosphate emulsification function. In Items 1 and 2, SAP broke the emulsion. In Item 3 sodium acid pyrophosphate shows a better balance of acid formation to phosphate emulsification with suitable sausage and satisfactory color. Reduction of acidity by mixing SAP with alkaline pyrophosphate or tripolyphosphate on a fifty-fifty basis results in good emulsions, but poor colors. The proper balance is essential for cure acceleration.

Using GDL and no phosphates in the composition to be emulsified, provides more acid during the curing step than during the emulsification. When the phosphate radical is present in the composition to be emulsified, some or all of the said GDL may be replaced by other acid, preferably derived from an acid-reacting phosphate.

EXAMPLE 4

A standardized meat composition of the formulation given in Example 2 was supplied with a mixture of 3 ounces of GDL and 3 ounces of SAP per 100 pounds of meat. This was formed into an emulsion at pH 5.45. The emulsion was promptly encased, and entered into a smokehouse at 300° F. (dry bulb) and 178° F. (wet bulb) for 11 minutes, producing an excellent pink color.

The invention may be carried out with all edible meat masses by use of fixed formulas calling for a definite amount of a composition balanced in acidifying material and in phosphate radical. Suitable compositions for use in the amount of 7 ounces per 100 pounds of meat have been satisfactorily used in the accelerated cure as shown in the following Table VI.

TABLE VI

| Material | Composition in Parts by Weight | | | | | | | | | | |
|---|---|---|---|---|---|---|---|---|---|---|---|
| | 1 | 2 | 3 | 4 | 5 | 6 | 7 | 8 | 9 | 10 | 11 |
| Glucono delta lactone | 2 | 3 | 3 | 5 | 3 | 3.5 | 3 | | | | |
| Sodium acid pyrophosphate | 5 | 4 | | | | | | 2 | 4 | 4 | 3 |
| Sodium aluminum phosphate | | | 4 | | | | 2 | 3 | | | 2 |
| Monosodium phosphate | | | 2 | 4 | | | | | 2 | | 2 |
| Monocalcium phosphate | | | | | 3.5 | | | | | 10 | |

It is to be understood that in addition to the foregoing, other compositions are also contemplated.

The foregoing description and explanation establish that non-shorting emulsions can be made and maintained at high curing temperatures, and at a pH lower than that of the meat component, when at least some of the acid for the cure is present during the emulsification in an amount which would produce a shorting emulsion except for the presence of a counteracting quantity of phosphate radical.

The higher acidity of the emulsion permits the cure to be quickly effected at temperatures in the range from 200° F. to 300° F. without shorting the emulsion, but only when a counteracting content of phosphate radical is present. In consequence, acidifying material is incorporated in a meat mass to be emulsified, and in quantity to effect a pH in the composition which is lower than the pH of the meat content, and also material to provide the phosphate radical is likewise incorporated. Consequently, it is preferred that the acidifying material consists of or includes an edible acid-reacting phosphate, of which among the numerous ones available, sodium acid pyrophosphate is preferred.

The invention in the various aspects for improved emulsification and improved curing is set forth in the appended claims without intention to limit the invention to or by the foregoing illustrative examples.

We claim:
1. The method which comprises emulsifying a meat composition to be cured which contains curing salt including essentially alkali metal nitrite, and a lactone which slowly hydrolyzes to edible acid, which composition during emulsification has a pH below the pH of the meat component thereof, said composition essentially containing at least one acid radical of edible acid of phosphorus, said acid radical being supplied by incorporating in the composition to be emulsified edible salt of such acid of phosphorus, the quantity of such salt being sufficient to avoid shorting the emulsion during emulsification and sufficient in conjunction with the acid resulting from all of said lactone after emulsification to avoid shorting the emulsion during the subsequent curing of the resulting emulsion.

2. The method of claim 1 in which the lactone is glucono delta lactone.

3. The method of claim 1 in which the edible salt is salt of pyrophosphoric acid.

4. The method of claim 1 in which the edible salt is supplied in part by at least an acid-reacting salt which in part at least contributes to said lowered pH of the composition during emulsification.

5. The method of claim 1 in which the edible salt is dissodium acid pyrophosphate.

6. The method of expeditiously curing meat which comprises emulsifying a meat composition to be cured, said composition containing curing salt including essentially alkali-metal nitrite, a lactone which slowly hydrolyzes to edible acid, and a non-shorting added quantity of edible acidifying material which lowers the pH of the composition to a value below the pH of the meat component thereof, said acidifying material comprising acid-reacting salt of an edible acid of phosphorus, the said lowered pH being sufficiently high to avoid shorting the emulsion during the emulsification and during the hereinafter recited hearing, promptly encasing the resulting emulsion to marketable form, promptly heating the resulting encased emulsion in an environment having a temperature in the range from 200° F. to 300° F. to attain an internal temperature of the encased meat of at least 150° F., whereby said meat is cured and its color fixed upon attaining said internal temperature, removing the cured meat from said environment, and cooling the removed meat.

7. The method which comprises emulsifying a meat composition to be cured which contains curing salt including essentially alkali metal nitrite, which composition during emulsification has a pH below the pH of the meat component thereof, said composition essentially containing at least one acid radical of edible acid of phosphorus, said acid radical being supplied by incorporating in the composition to be emulsified edible salt of such acid of phosphorus, said edible salt essentially including acid-reacting salt, the quantity of such radical being sufficient to avoid shorting of the emulsion during emulsification and during the subsequent curing of the resulting emulsion.

8. The method of claim 7 in which the acid-reacting salt is disodium acid pyrophosphate.

References Cited

UNITED STATES PATENTS

| | | | |
|---|---|---|---|
| 2,513,094 | 6/1960 | Hall | 99—159 |
| 2,627,473 | 2/1953 | Brissey | 99—159 X |
| 2,876,115 | 3/1959 | Epstein | 99—159 X |
| 3,028,246 | 4/1962 | Oliver et al. | 99—159 X |
| 3,029,150 | 4/1962 | Bickel | 99—159 X |
| 3,118,777 | 1/1964 | Lauck et al. | 99—222 |

HYMAN LORD, *Primary Examiner.*

UNITED STATES PATENT OFFICE
CERTIFICATE OF CORRECTION

Patent No. 3,391,007                                    July 2, 1968

Louis Sair et al.

It is certified that error appears in the above identified patent and that said Letters Patent are hereby corrected as shown below:

Column 2, line 8, "d-ico-" should read -- d-iso- --. Columns 5 and 6, TABLE II, second column, line 6 thereof, "$YaH_2PO_4$" should read -- $NaH_2PO_4$ --. Columns 7 and 8, TABLE VI, under the heading 10, line 5 thereof, "10" should read -- 3 --. Column 9, line 28, "hearing" should read -- heating --.

Signed and sealed this 18th day of November 1969.

(SEAL)
Attest:

Edward M. Fletcher, Jr.                        WILLIAM E. SCHUYLER, JR.
Attesting Officer                                    Commissioner of Patents